E. A. HAAKER.
RUBBER TIRE.
APPLICATION FILED JULY 16, 1914.
1,162,158.
Patented Nov. 30, 1915.
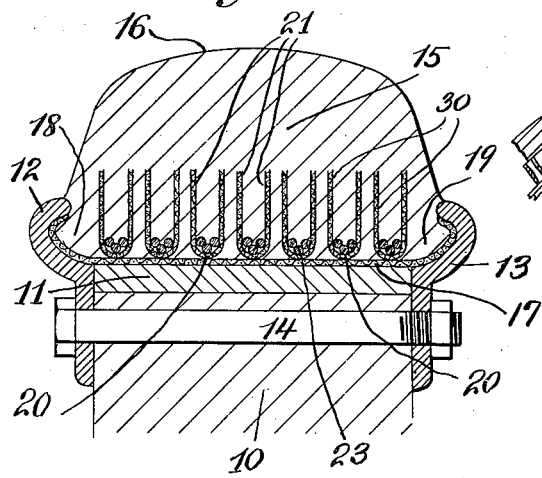
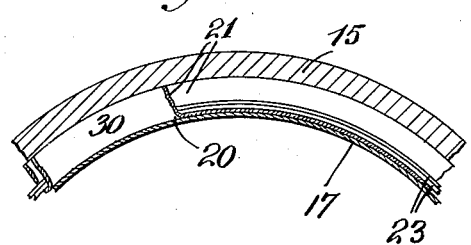

UNITED STATES PATENT OFFICE.

EDWIN A. HAAKER, OF ENGLEWOOD CLIFFS, NEW JERSEY.

RUBBER TIRE.

1,162,158.     Specification of Letters Patent.     Patented Nov. 30, 1915.

Application filed July 16, 1914. Serial No. 851,251.

*To all whom it may concern:*

Be it known that I, EDWIN A. HAAKER, a citizen of the United States of America, and a resident of Englewood Cliffs, Bergen county, New Jersey, have invented certain new and useful Improvements in Rubber Tires, of which the following is a specification.

This invention relates to improvements in rubber tires.

The object of the invention is to improve the construction of solid rubber tires so as to lengthen the life of the tire, make it wear longer and better and generally increase the efficiency thereof.

To this end the invention is embodied in a rubber tire as described hereinafter and as illustrated in the accompanying drawing in which—

Figure 1 is a sectional view of a rubber tire embodying my invention. Fig. 2 is a fragmentary longitudinal sectional view of the tire with parts broken away.

The subject matter of this invention is solid rubber tires for use chiefly on automobile trucks and similar vehicles. Some of the features of the invention may be used on other types of tires than that shown in the drawing and described hereinafter, but chiefly this invention is designed for use in connection with a type of tire comprising a solid rubber body which also forms the tread and which is adapted to be clamped to the rim of the wheel by means of separable side flanges.

The numeral 10 represents the felly of the wheel, usually of wood, and 11 denotes the metal rim shrunk on the felly. 12 and 13 are the tire retaining flanges between which the tire is clamped by bolts 14.

The tire comprises the body portion 15 forming the tread 16.

17 is a lining of fabric interposed between the base of the tire and the rim.

The tire further is formed with the flange engaging portions 18 and 19 adapted to be gripped by the flanges 12 and 13.

The particular improvement provided by this invention consists in embedding within the body of the tire and adjacent the inner diameter or base thereof suitable means for preventing the tire from spreading, becoming loose and rolling off the rim of the wheel. To this end I provide the tire with suitable retaining or strengthening means, which in this instance comprises folds of suitable fabric so arranged as to form a plurality of rings within the body of the tire and designed to reach well up into the latter with a view of strengthening the body portion to prevent it from spreading. Within each fold of the fabric I provide one or more strands of wire which serve as circumferential tension members to retain the tire onto the rim.

I may employ separately made rings of folded fabric and place them side by side across the base of the tire and within the body portion 15 so as to obtain the effect shown in Figs. 1 and 2 in which 30 represents folds of fabric, folded as at 20 and bent to form the sides 21 which reach well up into the body of the tire. Within and at the bottom of the fold I then place the circumferential tension members in the form of wires 23. I have shown three wires within each fold but a greater or lesser number may be used.

As usual the tension members are located near the base of the tire and there is a tendency of the wires of shearing or cutting through the rubber and which may cause the tire to creep and roll off the wheel. This tendency whatever the proper name or cause of it may be, I overcome by means of the folds of fabric which by being folded around the wires and embedded in the rubber, transfer or distribute the pull of the wires to the tire itself and thus greatly lessen the pull near the base and prevents the wire from cutting the rubber. Another advantage resides in the fact that any side thrust or crushing forces on the tire is distributed evenly laterally through the body thereof. The action and advantages of the fabric may be explained by stating that it reaches into the body of the tire and grips the material thereof at a plurality of places both circumferentially and laterally.

The folds of the fabric are vulcanized into the rubber so that it forms one inseparable mass as is usual in tire construction. The sides of the folds may be of the same dimension as shown in Fig. 1 and of a height substantially one half, more or less, of the thickness of the tire.

The number of wires used within the folds of the fabric is immaterial. This and other elements of the invention is susceptible of changes within the principle of the invention and the scope of the appended claim.

I claim:

The combination with a felly and a rim, of a solid tire of elastic material, a lining of fabric interposed between said rim and tire, a plurality of identical reinforcing elements placed alongside each other within the said solid tire across the base thereof adjacent the said rim, each of said reinforcing elements consisting of a strip of fabric folded once upon itself in the middle thereof to form a looped end and two sides of substantially equal width, and tension wires placed within the said looped end, said reinforcing elements being placed within said solid tire with their said loops touching the said lining and their said sides extending parallel into said tire at substantially right angle to the base thereof and forming flat continuous rings of fabric within the tire.

Signed at New York, N. Y., this 15th day of July, 1914.

EDWIN A. HAAKER.

Witnesses:
IVAN KONIGSBERG,
K. G. LEARD.